Figure 1:
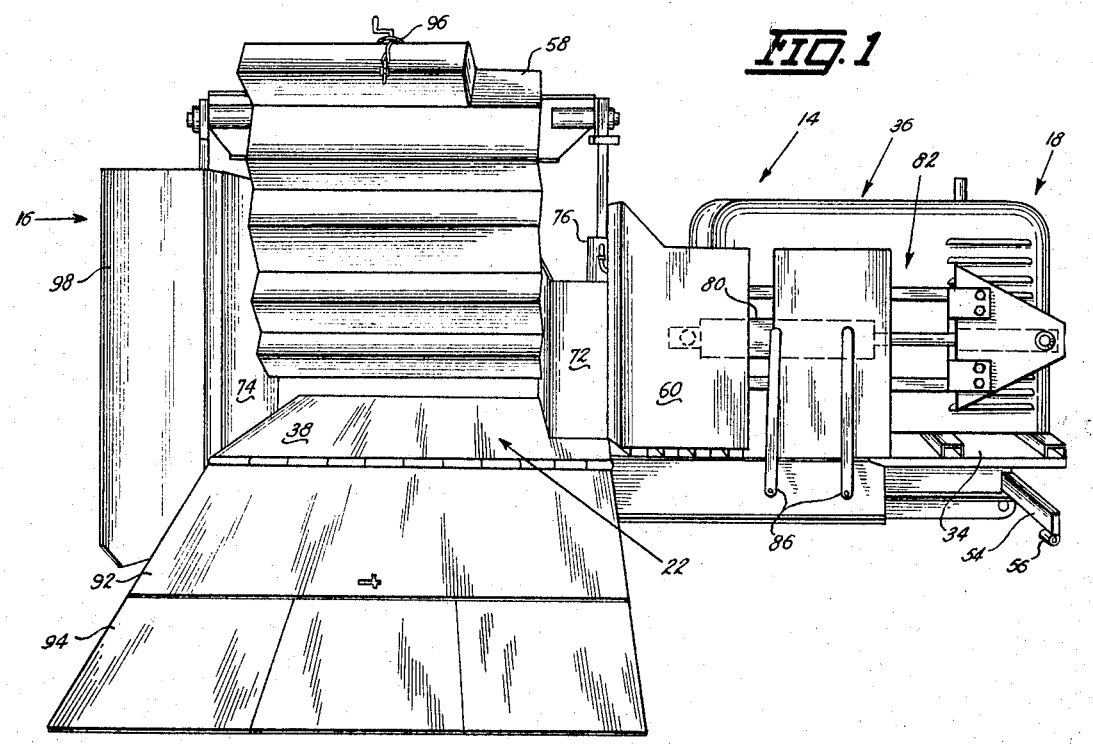

Aug. 16, 1966    A. B. SHARP ET AL    3,266,413
CAR CRUSHING MACHINE

Filed March 22, 1965    6 Sheets-Sheet 1

INVENTORS.
ALLEN B. SHARP
RICHARD A. HULL

BY Morton S. Adler
ATTORNEY.

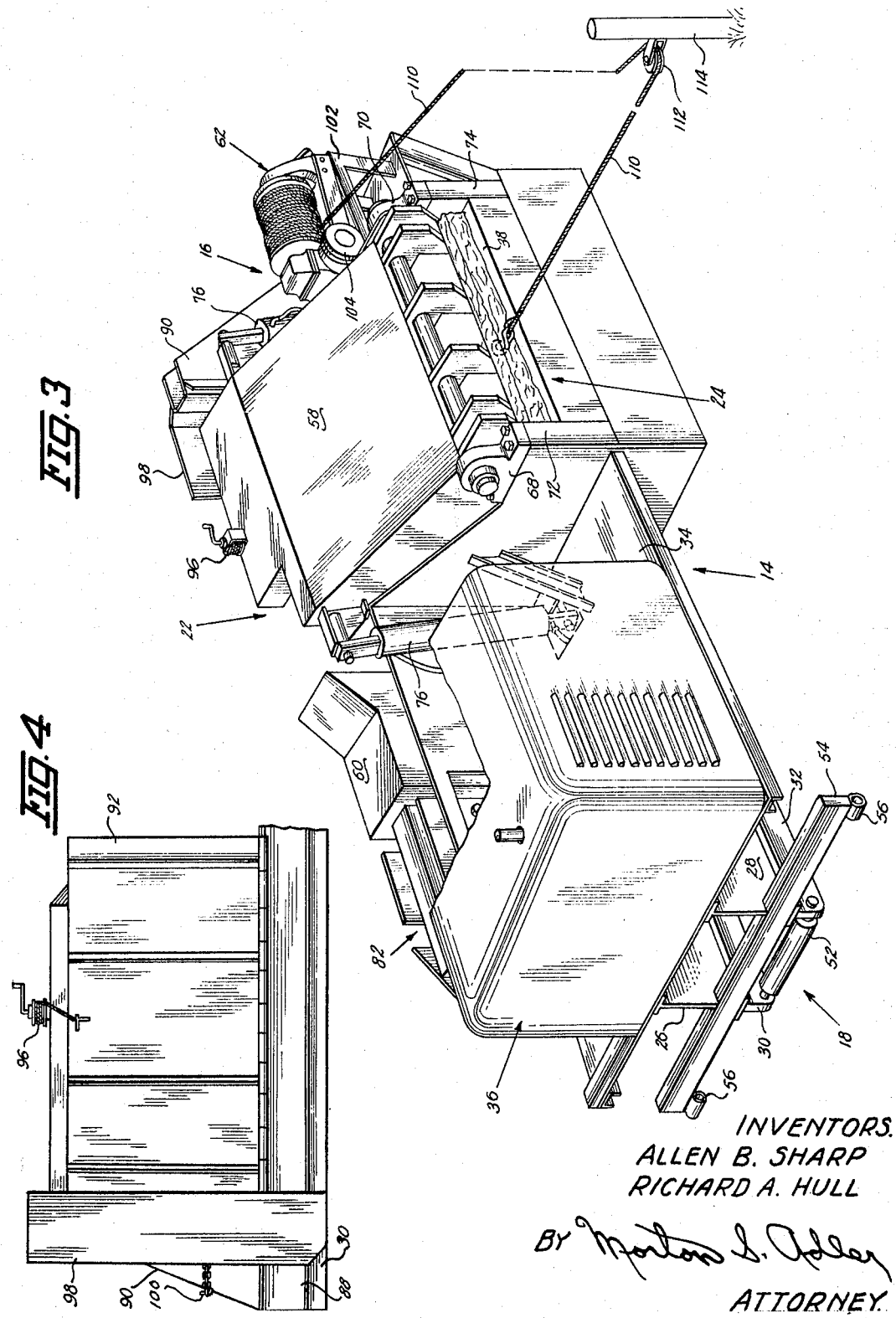

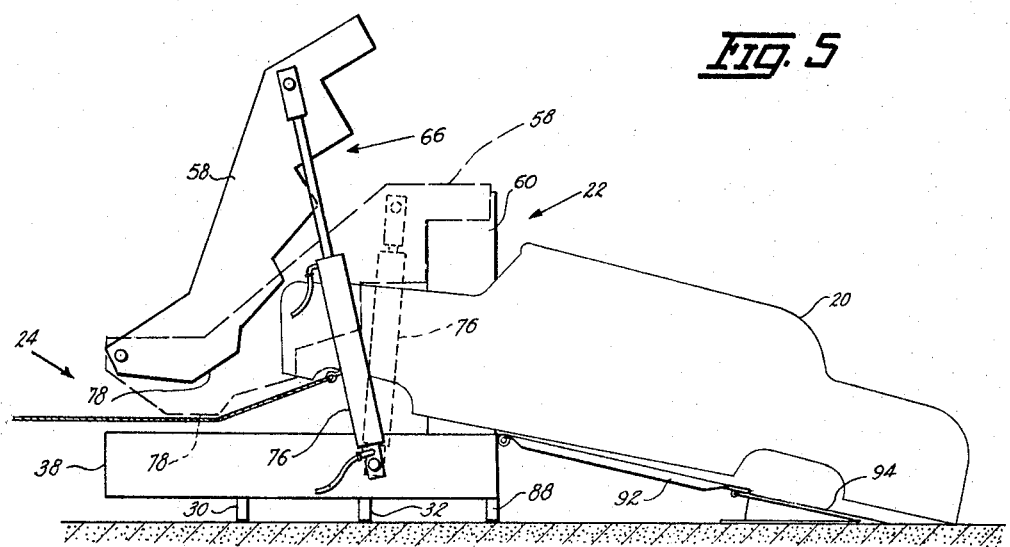
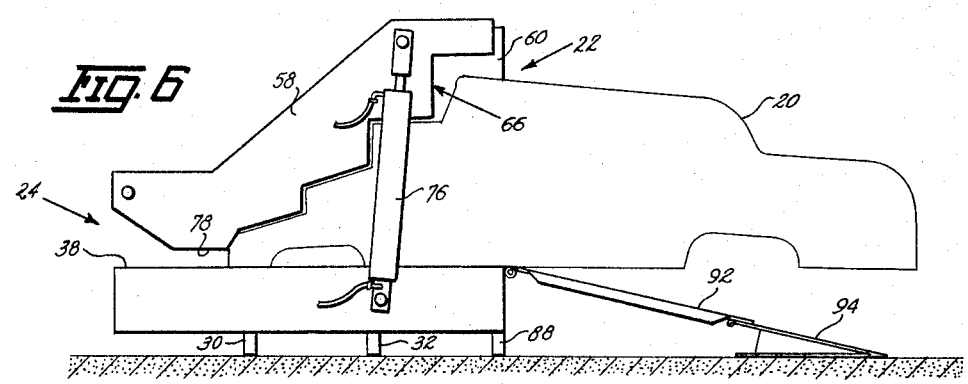
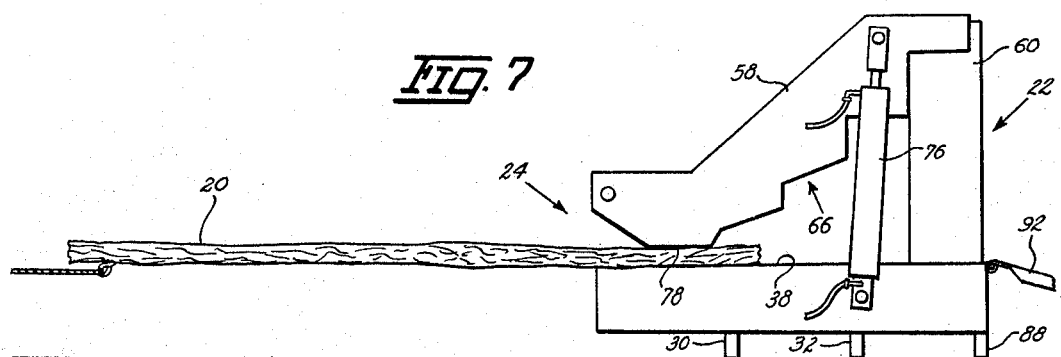

Aug. 16, 1966  A. B. SHARP ET AL  3,266,413
CAR CRUSHING MACHINE
Filed March 22, 1965  6 Sheets-Sheet 4
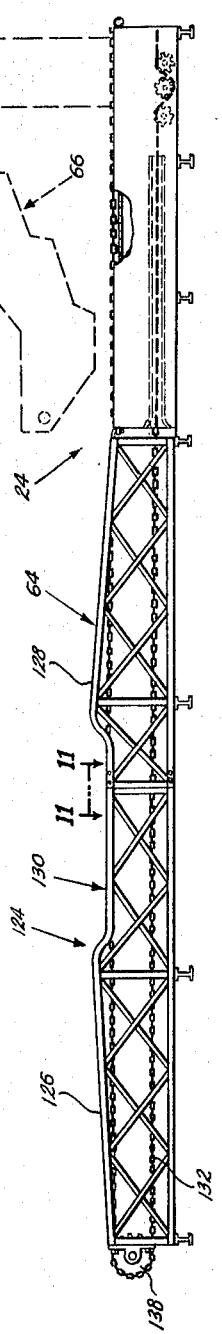
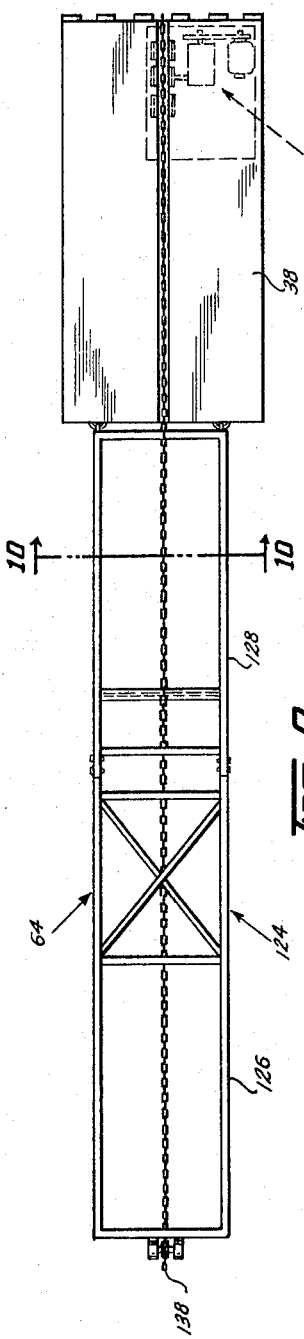
INVENTORS.
ALLEN B. SHARP
RICHARD A. HULL
BY
ATTORNEY.

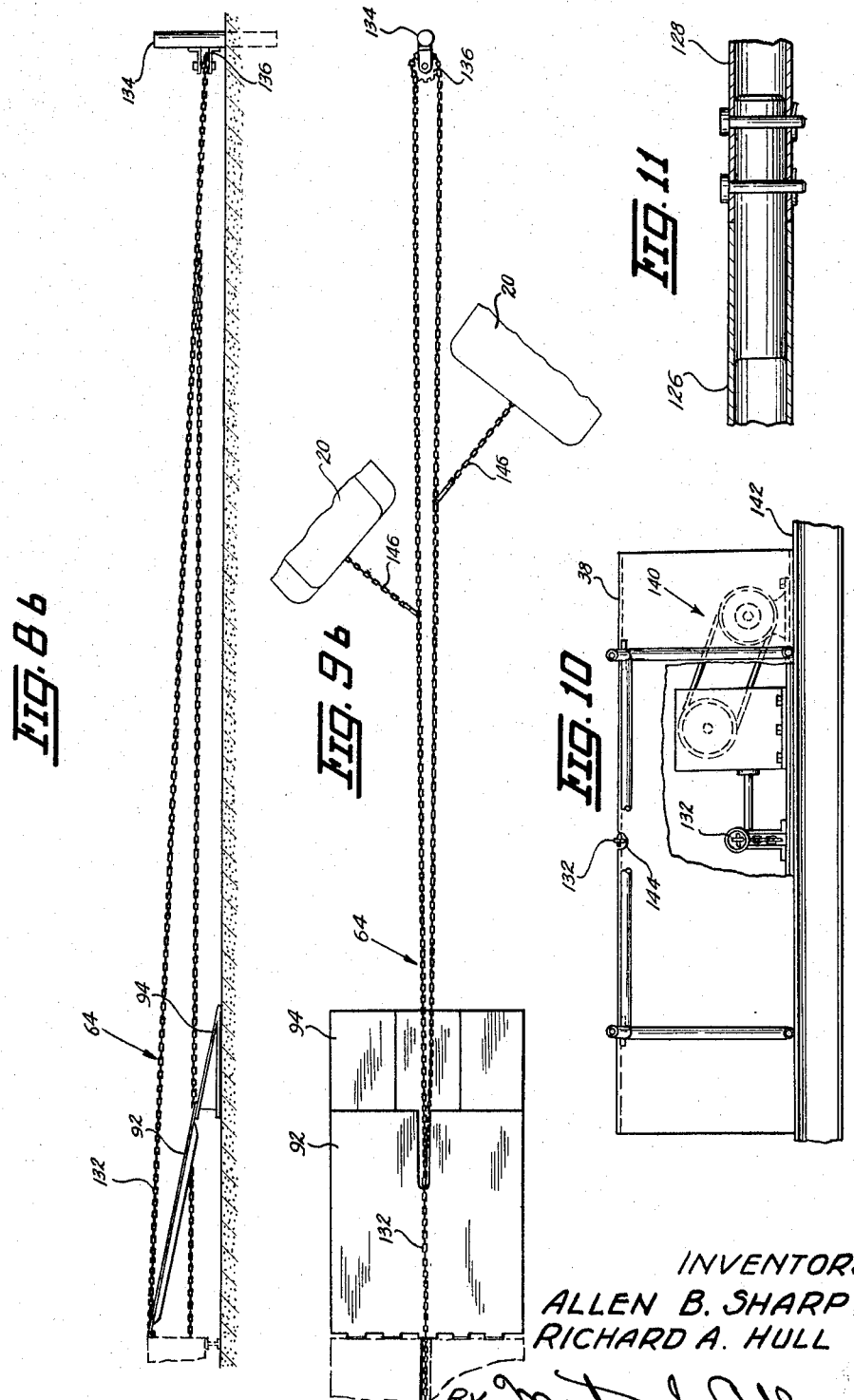

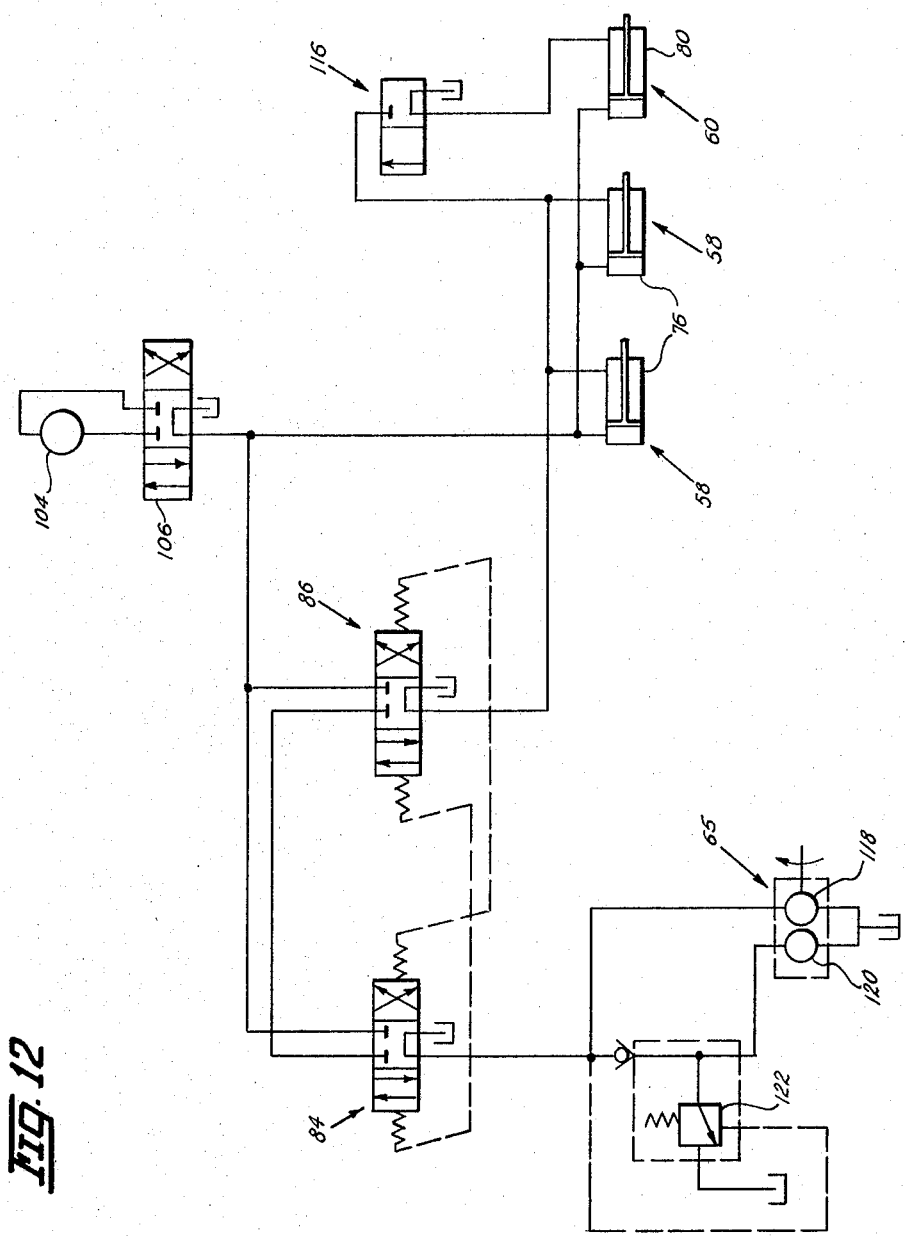

United States Patent Office 3,266,413
Patented August 16, 1966

3,266,413
CAR CRUSHING MACHINE
Allen B. Sharp and Richard A. Hull, Ottumwa, Iowa, assignors to Al-Jon, Inc., Ottumwa, Iowa, a corporation of Iowa
Filed Mar. 22, 1965, Ser. No. 441,589
18 Claims. (Cl. 100—53)

This invention relates to apparatus for crushing and flattening junk car bodies.

The junk automobile represents a source of scrap metal which can be utilized in the making of new steel and for this purpose, different processes have been developed for converting such scrap into re-usable material. However, the machinery necessitated by such processes is large, heavy and bulky and consequently is located at a fixed point so that scrap to be processed must be delivered to such points: In this regard it is self-evident that if the cost of getting the scrap to the processing mill equals or exceeds the value of the material when so delivered so as to leave little or no profit, there is no incentive or motive in a scrap owner to move such scrap and the increasing number and size of the so-called auto graveyards is mute testimony to the fact that it is not economical to transport junk cars for such processing.

Scrap transportation costs are determined by weight and when the material involved has a low density, which is true of junk cars, the maximum weight for a truck or railroad car for example, cannot be achieved so that the costs for car bodies are prohibitive since the value of the bodies that can be loaded is less than the transportation costs, even on a relatively short haul. In view of this problem, attempts are made to flatten the car bodies by dropping heavy weights on them with a crane but this is time consuming, relatively expensive and produces scrap of random sizes so that minimum ultimate savings are accomplished. Also, some large fixed equipment has been designed to crush car bodies but this entails additional expense of delivering the bodies to such equipment.

With the above observations in mind, it is one of the important objects of this invention to provide a new and unique car crushing machine that not only is highly efficient in operation but which is especially designed for portability so that it can be readily and economically transported to the site where junk car bodies have been accumulated. In this regard, a further object includes the construction of such a machine so that its overall size is within the legal limits required for movement over the public highways on a suitable prime mover.

Another important object contemplated by this invention is the provision of car crushing apparatus which causes the junk car bodies to be moved through a powerful hydraulically operated jaw that is associated with a complementary ram mechanism so that such bodies are reduced to a compact form of substantially uniform size. In this regard, the flattened car will be approximately six inches high, between five and six feet wide and substantially the same length as its original measurement.

More particularly it is an object herein to provide a stepped shaped lever arm pivotally attached at one end to a platform whereby a progressively greater force is applied to an object as it is moved toward the pivot point and the step feature affords a means for such object to be moved a fixed distance between each stroke of the lever arm.

A further object is to provide a car crushing machine of the above class which can be set up for operation or made ready for transporting within a few minutes by one operator.

Still another object is to provide a machine as characterized which has a self-contained source of power for its operation.

Another object contemplated herein is the provision of an improved machine for crushing and flattening junk car bodies which can be operated by one person and which can efficiently process a sufficient number of junk cars per hour so that the costs per car are materially reduced over present practices and results in the value per car when delivered to a processing mill being in excess of the costs for such flattening and delivery and accordingly, an economical and profitable means is provided for eliminating the rapidly increasing stockpiles of junked automobiles.

Figure 2:
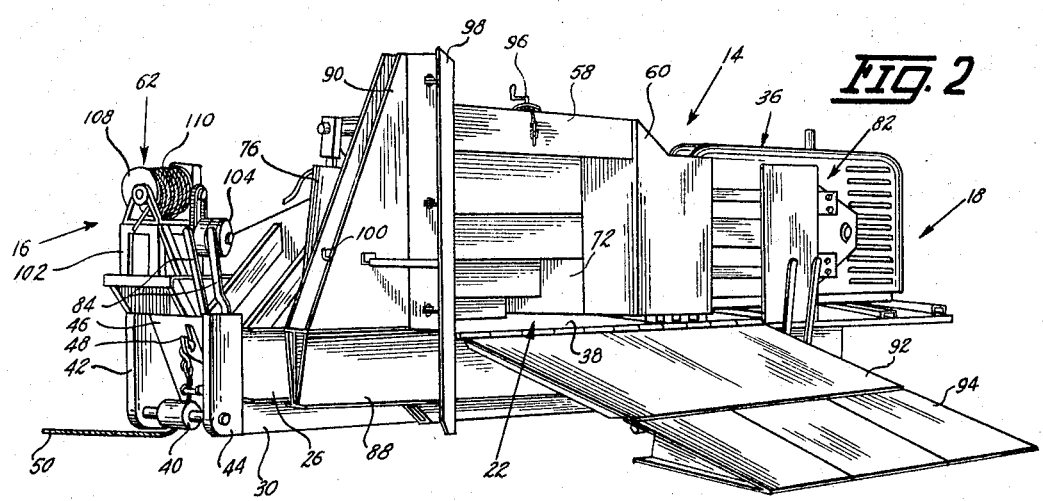

To attain these objects and such further objects as may appear herein, or be hereinafter pointed out, reference is made to the accompanying drawings forming a part hereof, in which:

FIG. 1 is an elevational view showing the ramp entrance and crushing arm of this new machine together with certain of the operating parts and power supply, FIG. 2 is a reduced perspective view of the machine seen in FIG. 1, FIG. 3 is a perspective view from the exit or opposite side of the machine seen in FIG. 2, FIG. 4 is a fragmentary elevational view showing the ramp folded up in the position employed when this machine is being transported, FIGS. 5, 6 and 7 are respective side schematic views showing the relative position of the crushing arm to a junk car body as the car is entering the machine from the ramp; as it is in the machine, and as it is leaving the machine from the exit side, FIGS. 8a and 8b are complementary and represent a side view of this machine including conveying cables associated with the ramp or entrance side and a second conveyor means associated with the exit side, such second conveyor being a modified form of car moving means from the winch and cable shown in FIG. 3, FIGS. 9a and 9b are also complementary and represent a top view of the apparatus shown in FIGS. 8a and 8b, FIG. 10 is a view from the exit end taken from the line 10—10 of FIG. 9a, FIG. 11 is a cross sectional view of the junction between sections of the exit conveyor taken on the line 11—11 of FIG. 8a, and FIG. 12 is a diagrammatic view of the hydraulic system used with this machine.

Referring to the drawings, this crushing machine designated generally by the numeral 14 is elongated in overall shape as best seen in FIGS. 2 and 3 so that it can be conveniently carried on a truck (not shown) as will later be referred to. For this purpose, machine 14 is designed so that it will be in conformity with legal requirements for transportation over public highways and accordingly it is approximately eight feet high, eight feet wide and eighteen feet long. Such dimensions are given merely by way of illustration, however, and of course may be varied, if desired.

To facilitate an understanding of the description to follow, end 16 of machine 14 will be referred to as the front end and end 18 as the rear end as relates to the adaptability of this machine for transportation, and as concerns the operation of this machine in processing junk car bodies 20, the entrance side is identified by the numeral 22 (FIGS. 1 and 2) and the exit side by the numeral 24 (FIG. 3).

The base or supporting structure for machine 14 comprises a pair of elongated spaced parallel I beams 26 and 28 (FIG. 3) extending between the front and rear ends 16 and 18 and each mounted on a respective skid or runner member 30 and 32. On approximately the rearward half portion of beams 26 and 28 there is a floor 34 to which is secured various parts of the power supply which will be later referred to and which is designated generally by the numeral 36. The forward portion of the beams 26 and 28 carry a platform 38 on which the actual crushing of the cars occurs as will appear and one of the novel features of this machine is that the entire assembly as thus referred to only generally is susceptible of being easily transported to the site of operation. For this purpose, the front end 16 includes the transversely arranged cross member in the form of a cylinder 40 disposed between upstanding members 42 and 44 at the front end of beams 26 and 28 as best seen in FIG. 2. A plate 46 is secured between members 42 and 44 and carries hook means 48 to which there can be secured one end of a cable 50 that will be passed below member 40 and extend to a winch or hoist (not shown) that can be mounted on a truck (not shown) for raising end 16 and pulling it onto the truck bed. To facilitate such an operation, a roller 52 (FIG. 3) is provided at the rear end 18 between skids 30 and 32 so that as this machine is lifted at the front, it can be moved on roller 52. A transverse tilt control bar 54 is above and parallel to roller 52 but extends substantially to the side extremities of floor 34 as seen in FIG. 3. Preferably each end of bar 54 carries a respective depending bumper or stop 56 spaced slightly above and normally out of contact with the ground but close enough to the ground so that it will engage the same if any lateral tilt of the machine 14 occurs while it is being loaded or unloaded onto a suitable trailer or other transporting vehicle.

The principal components of machine 14 include the power source 36, the hydraulically operated crushing arm 58 and battering ram 60 and the means for moving car bodies 20 across platform 38 from the entrance side 22 to the exit side 24 which may take the form of a winch mechanism 62 (FIG. 3) or a conveyor assembly 64 (FIGS. 8a–8b). For the power source 36 we have used a gasoline engine but either diesel or electric power plants may be employed, if desired and such power is utilized to drive a hydraulic pump 65 which is illustrated only in the schematic drawing of FIG. 12 since such pumps are commercially available and no invention is claimed therein per se.

The crushing arm 58, which is one of the novel features of this invention can best be described as being similar in shape to a stairway in view of the stepped outline 66 on the underside of the arm which engages the car body 20 as will become apparent. Arm 58 is preferably designed with a six-foot width although this may be varied and is pivotally secured at one end to the opposed bearings 68 and 70 at the exit side 24 of platform 38. Bearings 68 and 70 are mounted to the respective supports 72 and 74 which may be of any suitable type and which we show as end portions of side walls that are extended across platform 38 to the entrance side 22 to form an approximate six foot passageway or channel through which the car bodies 20 are moved. On each side of the other end of arm 58, near the entrance side 22, there is connected the respective two way acting hydraulic jacks 76 which are operatively connected to pump 65 in a well known manner. Thus far described, it is pointed out that when jacks 76 are fully retracted to position arm 58 in its down position (FIGS. 6 and 7) the position of the pivotally attached end of arm 58 at the exit side 24 is such that the lowermost step 78 on arm 58 is parallel to platform 38 and spaced approximately six inches above it.

With reference now to FIGS. 1 and 2, it will be noted that sidewall 72 terminates inwardly from the entrance side of platform 38 and thus provides room for movement of the battering ram 60 transversely of platform 38. Ram 60 is in the form of a large block operatively connected to a two-way hydraulic jack 80 carried by any suitable supporting structure 82 on floor 34. Jack 80 is also connected to pump 65 and is designed to move the ram 60 approximately one foot across the entrance edge of platform 38 toward wall 74. Jack 80 is interconnected with jacks 76 as will be later explained in detail and two sets of main controls are provided of which one set 84 is located adjacent the front end 16 of machine 14 and the other set 86 is located near jack 80.

The entrance side of platform 38 is reinforced underneath by the I-beam 88 (FIG. 2) which projects beyond wall 74 towards but not to the front end 16 and which extends in the opposite direction under ram 60 and part of floor 34. The forward projecting portion of beam 88 carries the large upstanding gusset-like plates or abutment 90 to provide adequate resistance for car bodies being crushed by ram 60 as will appear. Also at the entrance side of platform 38 there is provided a hinged ramp 92 for which there is a detachable ramp extension 94 that can be disposed as seen in FIG. 2. Ramp 92 can be folded up for travel as seen in FIG. 4 and for this purpose a small winch and cable 96 is mounted to arm 58. A deflector or guide plate 98 (FIG. 2) is hingedly affixed to the gusset 90 and can be positioned angularly to the left side of the ramp 92 as viewed in FIG. 2 where it acts as a curb to keep car bodies deflected toward the interior of platform 38 as they may be buffeted by ram 60. Plate 98 may be folded for travel (FIG. 4) and latched to gusset 90 by any suitable means such as member 100.

In the operation of machine 14, the car bodies 20 are moved across platform 38 as shown in FIGS. 5–7 and for this purpose we have employed at times both the winch 62 and the conveyor 64 and will first describe the operation in detail in relation to the winch which, as seen in FIGS. 2 and 3 is mounted on a supporting frame 102 at the front end 16 of machine 14. Winch 62 is hydraulically operated by motor 104 which is connected to the hydraulic system shown in FIG. 12 and includes the control valve 106. The drum 108 on winch 62 because of its location is angularly disposed relative to a center line between the entrance and exit sides 22 and 24 so that the winch cable 110 can be reeved around a pulley 112 secured to an anchor or deadman 114 located at a remote point out from side 24 and substantially equidistant between the side walls 72 and 74. The free end of the cable 110 is passed over platform 38, out through side 22 and attached to a car body 20 which will have been dragged or delivered to a point in the vicinity of ramp 92. The operation of the winch 62, arm 58 and ram 60 are all inter-related in the following manner.

Machine 14 can be operated by one person from either of the control locations 84 and 86 which are mechanically linked together. Such dual controls are a matter of convenience, however, and one may be eliminated, if desired. These controls are provided with a neutral position from which movement of the lever handle in different directions will effect the respective lowering and raising of arm 58 in a well-known manner. The winch valve 106 includes neutral, forward and reverse positions and when in either forward or reverse, is controlled by the main valves 84 or 86 so that it operates only when arm 58 is elevated and is inoperative when arm 58 is lowered. A control valve 116 for the jack 80 that powers ram 60 has an on and off position whereby ram 60 is retracted in the off position and in the on position, such ram is controlled by the main valves 84 and 86 so that with valve 116 on, jack 80 extends and retracts correspondingly with jacks 76. In this regard it is pointed out that the power stroke for each jack 76 and 80 is on the retraction of the piston rod so that the elevated or inoperative position of the arm 58 and the retracted or inoperative position of ram 60 coincides with the respective extended positions of the respective jacks associated therewith.

To start the operation of machine 14, cylinders 76 are fully extended so that arm 58 is elevated as seen in FIG. 5 and ram 60 is in its retracted position. In this position, winch 62 may be operated in either forward or reverse so that cable 110 may be run out to a car 20 at any distance within the range of the cable length. Such car 20 is then winched up ramp 92 where plate 98 helps guide it between sidewalls 72 and 74 onto platform 38. As the car is winched onto platform 38 the downward movement of arm 58 is started from one of the controls 84 or 86 and this automatically stops the operation of winch 62. At the same time, ram 60 moves against the side of car 20 so that the car receives a crushing blow both from the top and side, it being the purpose of the ram 60 to reduce the width of the car to approximately five feet before it progresses too far into contact with arm 58.

The first blow on the car from arm 58 will deform the hood section into a more or less step outline complementary with the shape of arm side 66. Thereupon, as arm 58 is elevated, winch 62 goes into operation and feeds the car toward the exit side 24 approximately the distance of one of the steps. More particularly in this regard when the arm 58 is going up, the oil flow from the pump 65 is directed to both the winch 62 and the arm cylinders 76 at the same time. Therefore, if the car 20 is not free to move forward, the oil follows the path of least resistance and raises the arm 58. When the arm 58 is fully extended, the arm cylinders block the oil flow so it can only go through the winch motor 104. At this time the car is fed forward until it can go no farther, causing a relief valve to open and let the oil flow back to a tank. In actual practice the arm 58 frees the car 20 before it is fully elevated so the car feeds at the same time that the arm is raising. The reason for this is that the pressure required to raise the arm is greater than that required to winch the car forward if the car is free to move.

The lowering and raising of arm 58 as described is repeated until car 20 has been completely moved past and under arm 58 and beyond the exit side 24 of platform 38 where its shape is that shown in FIG. 7 which is approximately six inches high, six feet wide and substantially its original length. During this operation, it will be understood that arm 58 being in effect a pivoted lever with a fixed force at one end, exerts a progressively greater force on the car body 20 as it is moved closer to the pivot point and this coordinates the lever action with the fact that the more the car is compressed, the greater the force required to compress it further. In addition, the novel feature of the stepped side 66 on arm 58 permits the car to be moved a fixed distance between each stroke of arm 58. Preferably the steps are sixteen inches and the height or riser distance between steps is progressively smaller toward the pivot point since the stroke of arm 58 becomes less as the car approaches this point. This stepped design of arm 58 results in a large area of car 20 being subjected to a crushing force on each power stroke since with the stepped outline formed on the car, the crushed car portion progressively moves toward the pivot point with each stepped area on the car moving into contact position from a succeeding step area on the arm 58.

While various systems of hydraulic power may be utilized to accomplish the action of arm 58, ram 60 and winch 62 described above, the system shown in FIG. 12 has proved to be very satisfactory. In this regard pump 65 is a double unit, one section 118 of which puts out twenty-seven g.p.m.; the other 120, fifty-three g.p.m. at a pump speed of 1800 r.p.m. and an engine speed of 3000 r.p.m. Since the engine torque is not sufficient to supply the total flow of eighty g.p.m. at 2000 p.s.i., the fifty-three gallon section 120 of the pump 65 is connected directly to tank by a pilot operated valve 122 whenever the system pressure exceeds 1500 p.s.i. For proper crushing a pressure of 2000 p.s.i. is required but for approximately ninety percent of the cylinder movements, the pressure stays under 1500 p.s.i. Therefore the pressure is available for crushing and the flow is available for speed. In order to speed up the raising of the arm 58 and the retraction of the ram 60, a regenerative circuit is used. In this circuit, both ends of the cylinders are connected to the pump at the same time which applies the same pressure to the case and shaft sides of the pistons. The force which results is dependent upon the area of the shaft and this force causes the cylinders to extend. The oil from the shaft end of the cylinders combines with the pump output to give an effective flow of almost twice the pump output, which increases the rate at which the arm 58 raises.

Referring now to FIGS. 8a–11, we have shown the conveyor assembly 64 which may be used in place of winch 62 for moving car bodies 20 through machine 14 where the action thereon by arm 58 is the same as described above. Assembly 64 includes an elongated braced frame structure 124 which may be in more than one section for ease of handling such as sections 126 and 128 that are removably connected to each other as seen in FIG. 11 and are designed for removable attachment to the exit side 24 of machine 14 (FIG. 8a). A section of the top surface of structure 124 is recessed as at 130 for reasons to be later explained. An endless conveyor chain extends the length of structure 124, through machine 14 relative to sides 22 and 24 and beyond ramp 92 to a remote anchor 134 (FIG. 8b) where it engages the sprocket 136 on anchor 134 and at the outer end of structure 124, (FIG. 8a) engages the sprocket 138. A drive assembly 140 for chain 132 is mounted below platform 38 on a suitable base 142 as best seen in FIG. 10 and a groove 144 is provided in platform 38 between sides 22 and 24 in which the upper or load portion of chain 132 will travel in the direction of exit side 24.

With the above arrangement for assembly 64, car bodies 20 can be engaged therewith by a chain section 146 (FIG. 9b) for movement through machine 14 where operation of the drive assembly 140 is adapted to function in a similar manner as that described for winch 62. As the flattened car body is moved onto structure 124, it will overlie the recess 130 and such recess thus provides an adequate space to receive lifting forks on a loader or the like (not shown) which may be employed to transfer the cars to a point of deposit.

The advantages of machine 14 as described can be readily appreciated since it makes it possible to substantially increase the number of junked cars that may be carried in a truck or railroad car. For example, a truck load of car bodies with frames attached will normally consist of not more than five cars having a total weight of 7500 pounds so that the value of the cars when delivered to a processing mill is less than the charge for the truck. However, by loading the same truck with cars crushed by machine 14, the load can be increased to 35,000–45,000 pounds which makes the operation economically practicable. More particularly in this regard it is pointed out that with the type of cars 20 involved, all valuable items such as bright metal, wheels, engines, rear axles, transmissions, etc. will have been removed and the car then burned to destroy upholstery, wiring and items of non-ferrous materials. The resulting car body with frame has an approximate value of seven dollars when delivered to a processing mill so that it is obvious the cost of delivery per car must be sufficiently below the car's value to make it attractive for owners of such cars not to accumulate them in auto graveyards. Consequently, by way of example, if 40,000 pounds are hauled on one truckload, for a distance of 200 miles, the freight cost for one car will be about $2.20 and this would leave $4.80 as the maximum which can be spent for flattening. Since machine 14 is a one-man operation and will handle 15 to 25 cars per hour, the cost per car is about 40¢ labor (at $6.00 per hour) plus $1.20 for fuel, machine depreciation and maintenance for a total flattening cost of $1.60 per car. This is far enough under the $4.80 to allow for some longer hauls or some higher costs plus a profit.

The value of machine 14 is enhanced by the fact that it is relatively easily transported to the site of operation and can thus be set up wherever a number of junked cars have been accumulated. The ramp 92 is foldable as indicated and structure 124 together with the ramp extension 94 can be stored on machine 14 for purpose of movement. Chain 132 is of course collapsible and can be placed in a suitable compartment under platform 38 and any suitable winch equipped prime mover having an adequate bed can be used for loading and unloading this machine.

It should be pointed out that the six inch spacing between step 78 on arm 58 and platform 38 contemplates the usual removal of the car axle as mentioned previously, but in situations where such axles are not removed, as sometimes is the case, it will be appreciated that the relative position of step 78 to platform 38 can be increased to more than six inches as may be required. It can also be mentioned that in the business of salvaging junk cars, such cars are sometimes subjected to an acid bath to remove the several parts generally destroyed by burning, and in this respect, the compressed form of the car after it leaves this car crusher is such that it can be more conveniently immersed in such acid bath than in its uncrushed state.

It is thus submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:
1. A machine for crushing junk car bodies, comprising:
an elongated base,
a hydraulic pump system and power means for operating said system carried by said base,
a platform secured to said base,
said platform having two opposed open sides of which one defines an entrance side and the other defines an exit side,
a ramp hingedly attached at one end to said entrance side and extending therefrom to ground level,
bearing members on opposed sides of said exit side,
an elongated crushing arm pivotally secured at one end to said bearing members,
a hydraulic jack at each side of the other end of said crushing arm and pivotally connected thereto,
said hydraulic jacks operatively mounted to said base and said hydraulic system and designed to raise and lower said crushing arm,
the pivotally attached end of said crushing arm disposed so that it remains approximately six inches above said platform,
means for dragging a junk car body up said ramp, across said platform and off of the exit side thereof, and
control means for said hydraulic system whereby said crushing arm can be alternately raised and lowered to act against and crush a car body being dragged across said platform with said car body being reduced to a height of approximately six inches.

2. A machine as defined in claim 1 wherein:
said means for dragging a car body across said platform is a hydraulically operated winch connected to said hydraulic system and regulated by said control means, and
said hydraulic system including valve means affecting said crushing arm and said winch so that said winch is operable to move a car body toward the pivot point of said crushing arm as said arm is elevated and to become inoperable when said car body has abutted said arm and when said arm is being lowered.

3. A machine for crushing junk car bodies, comprising:
an elongated base,
a hydraulic pump system and power means for operating said system carried by said base,
a platform secured to said base,
said platform having two opposed open sides of which one defines an entrance side and the other defines an exit side,
spaced sidewalls on said platform defining a passageway between said entrance and exit sides,
an elongated crushing arm pivotally mounted at one end intermediate said sidewalls at said exit end and disposed so that said pivoted end is spaced approximately six inches above said platform,
hydraulic jack means connected to said hydraulic system and disposed on said base and connected to the other end of said crushing arm for selectively raising and lowering the same,
a hydraulically operated battering ram connected to said hydraulic system and disposed on said base adjacent said entrance side for movement into and out of said passageway,
means for dragging a car body through said passageway from said entrance side to said exit side, and
control means for said hydraulic system whereby said crushing arm can be alternately raised and lowered to act against and crush a car body being dragged across said platform and for causing said battering ram to move into said passageway and act on the car body on each downward stroke of said crushing arm.

4. A device as defined in claim 3 including control means for rendering said battering ram inoperative.

5. A machine as defined in claim 3 wherein:
said means for dragging a car body across said platform is a hydraulically operated winch connected to said hydraulic system and regulated by said control means, and
said hydraulic system including valve means affecting said crushing arm and said winch so that said winch is operable to move a car body toward the pivot point of said crushing arm as said arm is elevated and to become inoperable when said car body has abutted said arm and when said arm is being lowered.

6. A machine as defined in claim 3 wherein:
the car body engaging side of said crushing arm defines a stair step outline so that the downward stroke of said crushing arm deforms the portion of the car contacted into a corresponding shape, and
said car body is moved toward the pivot point of said crushing arm a step distance on each upward stroke of said arm.

7. A machine as defined in claim 3 wherein:
said means for dragging a car body across said platform is a conveyor chain operatively engaged with remote points spaced outwardly respectively from said entrance and exit sides, and
including power means on said base for operating said conveyor chain.

8. A machine as defined in claim 3 wherein:
said base has a forward and rear end,
a roller member on said rear end,
hook means on said front end,
said machine being designed so that it can be lifted by said hook means with a source of power and moved on said roller for the purpose of being loaded onto a prime mover for transportation to any desired site of operation, and
said machine having an overall width not exceeding eight feet for purposes of highway travel.

9. In a device for crushing junk car bodies:
a base,
a platform on said base and having an entrance side and an exit side,
an elongated crushing arm pivotally secured at one end relative to said exit side so that said pivotally attached end is in spaced relationship above said platform,
hydraulic jack means on said base and adjacent said entrance side and operatively connected to the other end of said crushing arm for raising and lowering the same,
means on said base for powering said hydraulic jack means,
means for moving a junk car body across said platform from said entrance side, under the pivoted end of said crushing arm and out from said exit side, and
control means for said hydraulic jack means whereby said crushing arm can be alternately raised and lowered to act against and crush the car body as it is moved over said platform.

10. A device as defined in claim 9, including:
an abutment on said platform at one side of said entrance side,
a hydraulically operated ram operatively associated with said hydraulic jack means and disposed on said base adjacent said entrance side for movement relative to said platform toward and away from said abutment, and
said ram being subject to said control means so that it moves toward and away from said abutment respectively with the respective downward and upward stroke of said crushing arm.

11. A machine as defined in claim 9 wherein:
said means for moving a car body across said platform is a conveyor chain operatively engaged with remote points spaced outwardly respectively from said entrance and exit sides, and
including power means on said base for operating said conveyor chain.

12. A device as defined in claim 9 wherein:
said means for moving car bodies over said platform is a hydraulic winch operatively associated with said hydraulic jack means and regulated by said control means, and
said crushing arm and said winch means being hydraulically inter-connected so that said winch is actuated to move a car body toward the pivot point of said crushing arm as said arm is elevated and is deactuated when said car body has abutted said arm and when said arm is on its downward stroke.

13. A machine as defined in claim 12 wherein:
the car body engaging side of said crushing arm defines a stair step outline so that the downward stroke of said crushing arm deforms the portion of the car contacted into a corresponding shape, and
said car body is moved toward the pivot point of said crushing arm a step distance on each upward stroke of said arm.

14. In a device for crushing junk car bodies:
a platform having an entrance side and an exit side,
spaced bearings on said exit side,
a crushing arm with a stair step configuration that is pivotally secured at one end to said bearings so that said pivoted end is spaced above said platform sufficiently to permit the passage of a crushed car body,
means for selectively raising and lowering said crushing arm,
means for moving a car body across said platform and under said crushing arm whereby said arm can be operated in alternate up and down strokes as a jaw in a crushing action against such car body,
the shape of said crushing arm acting to deform said car body correspondingly, and
the movement of said car body toward the pivot point of said crushing arm being a distance corresponding to one step on each upward stroke of said crushing arm.

15. A device as defined in claim 14 including:
an abutment on said platform at one side of said entrance side,
a ram,
means to reciprocate said ram relative to said platform toward and away from said abutment, and
said last mentioned means being inter-connected with said means for raising and lowering said crushing arm so that said ram moves toward and away from said abutment respectively with the respective downward and upward stroke of said crushing arm and acts against said car body from the side thereof on each movement toward said abutment.

16. In a device for crushing a junk car body:
a platform,
an elongated crushing arm pivotally secured at one end in close proximity above said platform,
means to vertically reciprocate the other end of said crushing arm,
means to feed a junk car body toward and under the pivot point of said crushing arm while it is being reciprocated,
said crushing arm being stair stepped in configuration to deform a car body correspondingly, and
means interconnecting the means for reciprocating said crushing arm and the means for feeding a car body toward said pivot so that said car body is moved intermittently a distance corresponding to one step during each upward stroke of said crushing arm.

17. A device as defined in claim 16 including:
an abutment on said platform at one side of said entrance side,
a ram,
means to reciprocate said ram relative to said platform toward and away from said abutment, and
said last mentioned means being inter-connected with said means for reciprocating said crushing arm so that said ram moves toward and away from said abutment respectively with the respective downward and upward stroke of said crushing arm and acts against said car body from the side thereof on each movement toward said abutment.

18. A platform having an entrance side and an exit side,
an elongated crushing arm, pivotally secured at one end relative to said exit side so that said pivotally attached end is in close spaced proximity above said platform,
means operable from said platform for dragging a junk car body from a remote point across said platform from said entrance side, under the pivoted end of said crushing arm and out from said exit side, and means to vertically reciprocate said crushing arm on its pivoted end so that said crushing arm acts to deliver a succession of crushing blows to said junk car body as it is moving over said platform and with the degree of force exerted on said junked car body being progressively increased as it approaches the pivoted end of said crushing arm.

References Cited by the Examiner

UNITED STATES PATENTS

| | | | |
|---|---|---|---|
| 2,373,057 | 4/1945 | Shinn | 100—233 |
| 2,986,992 | 6/1961 | Patros et al. | 100—218 |
| 3,077,827 | 2/1963 | Bunke et al. | 100—233 X |
| 3,101,045 | 8/1963 | Van Endert | 100—29 X |
| 3,124,062 | 3/1964 | Thompson | 100—215 |
| 3,170,389 | 2/1965 | Parks | 100—192 |

FOREIGN PATENTS 845,438  11/1952  Germany.

WALTER A. SCHEEL, *Primary Examiner*.